2 Sheets—Sheet 1.

B. M. NYCE.

BUILDING FOR PRESERVING FRUITS AND OTHER SUBSTANCES.

No. 3,252. Reissued Jan. 5, 1869.

Witnesses.
G. J. Gordon
F. J. Baldwin

Inventor
Benjamin Markley Nyce

2 Sheets—Sheet 2.
B. M. NYCE.
BUILDING FOR PRESERVING FRUITS AND OTHER SUBSTANCES.
No. 3,252. Reissued Jan. 5, 1869.
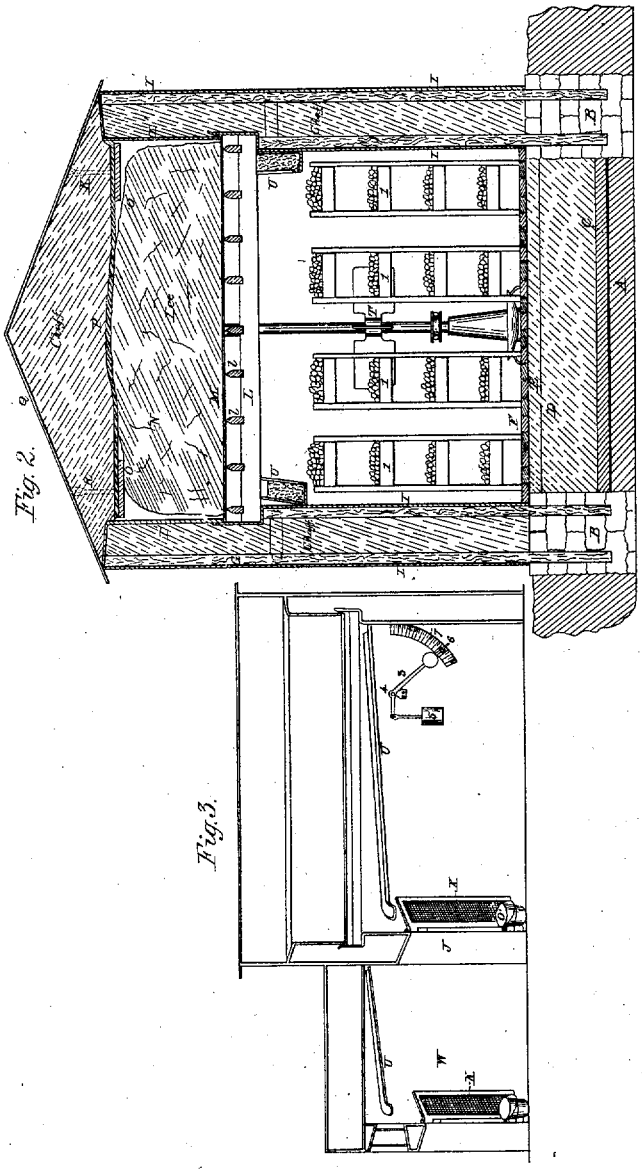
Witnesses
S. J. Gordon
F. J. Baldwin
Inventor:
Benjamin Markley Nyce United States Patent Office.

BENJAMIN MARKLEY NYCE, OF CLEVELAND, OHIO.

*Letters Patent No.* 31,734, *dated March* 19, 1861; *reissue No.* 3,252, *dated January* 5, 1869.

IMPROVEMENT IN BUILDINGS FOR PRESERVING FRUITS AND OTHER SUBSTANCES.

The Schedule referred to in these Letters Patent and making part of the same

*To all whom it may concern:*

Be it known that I, BENJAMIN MARKLEY NYCE, of Cleveland, in the county of Cuyahoga, State of Ohio, formerly of Kingston, Indiana, having invented new and useful Improvements in Houses for Preserving Fruits, Meats, and other organic matter of a perishable nature, and peculiarly adapted to the successful brewing and keeping of lager-beer, do hereby declare that the following is a full, clear, and exact description thereof, reference being had to the accompanying drawings, making a part of this specification, in which—

Figure 2 is a transverse section of the same.

Figure 1:
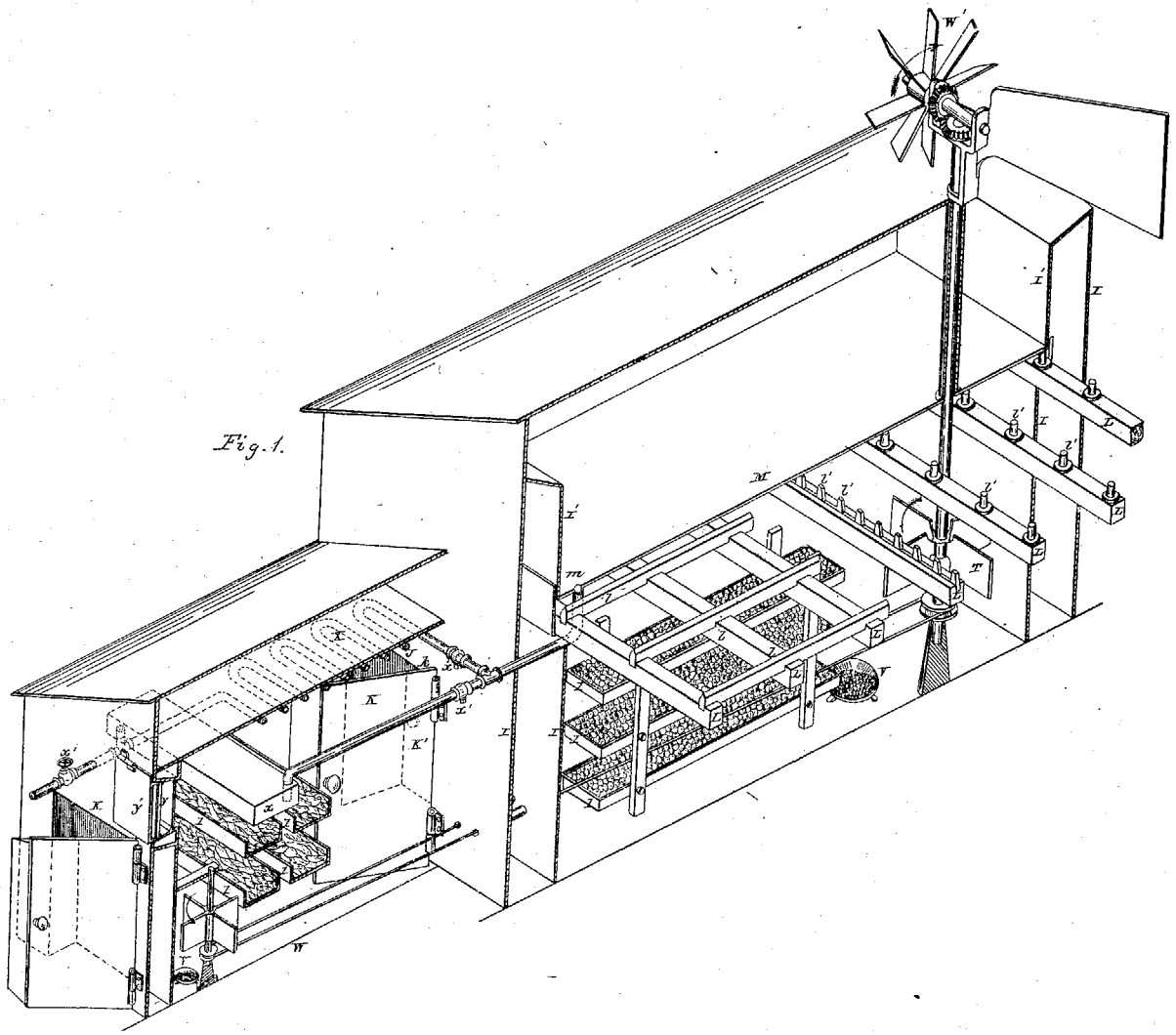
Figure 1 is a perspective vertical section of my improved house.

Figure 3, a longitudinal section thereof.

Similar letters of reference indicate corresponding parts in each figure.

This is an improvement in preserving and refrigerating-receptacles for perishable substances; and The invention consists in—

First, the mode of supporting and insulating the ice, to secure the most complete, equable, and uniform chill to the receptacle.

Second, a peculiar form of insulating-cover to the ice-reservoir.

Third, an entrance-chamber or vestibule.

Fourth, an arrangement of absorbent-vessels.

Fifth, a provision to determine excess of moisture.

The ground-surface A, enclosed by walls B, should be coated with a durable and impervious substance, C, like pitch or cement, to exclude moisture.

Upon such coating should be spread about three and a half feet of chaff, D, upon which lay joists, E, to support a vapor-proof floor, F, of wood, metal, or cement, which will exclude odor from beneath and moisture from above.

The double enclosing-walls must be practically air and heat-tight, and may be made as follows:

G and G′ are outer and inner frame-works of scantling, sheathed with sheet-metal, I I′, the joints secured by solder, overlapping and nailing, or otherwise.

Sheet-metal gas-tight partitions will subdivide the receptacle, so that different articles will be unaffected by the odor of other articles.

The annular space G and G′ is packed with chaff, or other non-conductor, and also the doors K K′.

L L are supporting-beams of ice-reservoir N.

On these beams are laid joists, *l*, by bevelling or making pointed the upper edges of which, ice-floor M, resting thereon, will have increased surface-exposure, in proportion to the fineness of the bevel, and the chill therefrom will be equable at all points—the more so if the edges are metal-covered.

In this way uniformity of melting of ice is secured, and disproportionate pressure on any one part of floor M avoided.

Blocks, C′, of wood, metal, or other material, may be used in place of the joists—metal for the higher purposes of refrigeration; poorer conductors, as less refrigeration is desired.

Ice-floor M is made of galvanized zincked iron, descending slightly to ventages, *m*, for the melted ice.

O is a board covering for the ice, supporting a tarpaulin diaphragm, P.

R R are cords, depending from roof Q, by which to lower the cover as the ice melts.

T is an atmospheric agitator, operated by windmill W′, to bring air in contact with the aqueous and septic gases.

U U are shallow troughs, slightly inclined, to contain chloride of calcium, to absorb moisture, which is caught by vessel Q′.

V V are pans for charcoal, or other antiseptic substance.

H H are shelves.

W is a vestibule, containing coil X and tank *x*, to receive the ice meltings. Its temperature may be varied by opening or closing faucet *x*′.

Y is a double window, closed by a thick non-conducting shutter, Y′.

To determine the exact hygrometric condition of the air, I employ a bent beam, 3, poised on fulcrum 4, and having at one end cup 5, containing a solution of chloride of calcium, and at its other end pointer 6, which, as the cup rises or falls, indicates on scale 7 the slightest change of moisture.

A receptacle thus constructed and provided will maintain an even temperature throughout the year, as low as 34°, with perfect freedom from dampness.

It is obvious that there are purposes to which these improvements are applicable that do not require cold as excessive, or atmosphere as dry, as to preserve fruit through successive seasons. For example, to preserve lager-beer, a temperature of 46° will answer, 43° being the best temperature to insure the slow and even chemical changes necessary during its two weeks of fermentation—a necessity which has heretofore closed almost all the breweries of the world from June to September.

For all such purposes the strict conditions herein stated may be modified, precisely as greater or less cold or dryness is desired. If moisture is not detrimental, leave out the absorbents. If a uniform temperature of 40° will suffice, the walls may be less perfect, and the instructions for insulating the metal ice-floor less rigidly adhered to.

What I claim as new, and desire to secure by Letters Patent, is—

1. An insulated house, constructed substantially as and for the purposes described, having an ice-reservoir above, and separated from it by an air-tight metallic floor.

2. The combination of vestibule W, furnished, as described, with a house so insulated and cooled.

3. The use, in such a house, of a hygrometer, constructed substantially as explained.

BENJAMIN MARKLEY NYCE.

Witnesses:

S. J. GORDON,

GEO. H. COLLINS.